US008646829B2

(12) United States Patent
Crane et al.

(10) Patent No.: US 8,646,829 B2
(45) Date of Patent: Feb. 11, 2014

(54) COMPOSITE LIFT GATE DEFORMABLE SECTION

(75) Inventors: Michael W. Crane, Rochester, MI (US); Gari M. Schalte, Oakland Township, MI (US); Thomas E. Cobb, Harrison Township, MI (US); Norman E. Guschewski, Rochester, MI (US)

(73) Assignee: Magna International Inc., Aurora (CA)

( * ) Notice: Subject to any disclaimer, the term of this patent is extended or adjusted under 35 U.S.C. 154(b) by 124 days.

(21) Appl. No.: 13/327,867

(22) Filed: Dec. 16, 2011

(65) Prior Publication Data

US 2012/0153670 A1 Jun. 21, 2012

Related U.S. Application Data

(60) Provisional application No. 61/459,619, filed on Dec. 16, 2010.

(51) Int. Cl.
*B60J 5/10* (2006.01)
*B62D 33/027* (2006.01)

(52) U.S. Cl.
USPC ............. 296/146.5; 296/187.03; 296/56; 296/146.8

(58) Field of Classification Search
USPC ............. 296/50–62, 187.03, 187.11, 146.6, 296/146.8
See application file for complete search history.

(56) References Cited

U.S. PATENT DOCUMENTS

| | | | |
|---|---|---|---|
| 5,228,742 A * | 7/1993 | Johnson et al. | 296/191 |
| 5,325,632 A * | 7/1994 | Djavairian et al. | 49/502 |
| 5,660,427 A * | 8/1997 | Freeman et al. | 296/190.08 |
| 5,947,540 A * | 9/1999 | Pariseau et al. | 296/57.1 |
| 6,015,182 A * | 1/2000 | Weissert et al. | 296/146.6 |
| 6,471,279 B2 * | 10/2002 | Pommeret | 296/57.1 |
| 6,929,308 B2 * | 8/2005 | Komatsu et al. | 296/146.5 |
| 6,951,357 B2 * | 10/2005 | Armstrong et al. | 296/57.1 |
| 6,991,694 B2 * | 1/2006 | Roehr | 156/245 |
| 7,118,153 B2 * | 10/2006 | Kitayama et al. | 296/57.1 |
| 7,306,279 B2 * | 12/2007 | Saitoh | 296/146.8 |
| 7,614,681 B2 * | 11/2009 | Saitoh et al. | 296/146.5 |
| 7,614,685 B2 * | 11/2009 | Oka | 296/187.12 |
| 7,618,083 B2 * | 11/2009 | Munenaga et al. | 296/146.6 |
| 8,123,277 B2 * | 2/2012 | Aldersley et al. | 296/146.9 |
| 8,177,285 B2 * | 5/2012 | Ishitobi et al. | 296/146.6 |
| 8,220,855 B2 * | 7/2012 | Nakamura | 296/56 |
| 2003/0110705 A1 * | 6/2003 | Hlavach et al. | 49/501 |
| 2004/0178659 A1 * | 9/2004 | Komatsu et al. | 296/146.5 |
| 2005/0057064 A1 * | 3/2005 | Kitayama et al. | 296/51 |
| 2008/0197652 A1 * | 8/2008 | Stratten | 296/57.1 |
| 2010/0289289 A1 * | 11/2010 | Bator et al. | 296/55 |
| 2012/0153670 A1 * | 6/2012 | Crane et al. | 296/187.11 |
| 2013/0001982 A1 * | 1/2013 | Ohba et al. | 296/187.11 |
| 2013/0076070 A1 * | 3/2013 | Ogawa et al. | 296/187.11 |
| 2013/0088046 A1 * | 4/2013 | Seitz et al. | 296/193.11 |

* cited by examiner

*Primary Examiner* — Glenn Dayoan
*Assistant Examiner* — Gregory Blankenship
(74) *Attorney, Agent, or Firm* — Warn Partners, P.C.

(57) ABSTRACT

A lift gate having a deformable section which allows the lift gate to deform rather than break during a low speed impact event. The lift gate has a deformable section located between an inner panel and an outer panel. The deformable section is able to deform during a low speed impact event against the outer panel, thereby preventing the inner panel from receiving any of the impact. This allows the inner panel to be significantly more rigid than the outer panel and the deformable section, and, therefore, provides the necessary structural support for the lift gate while withstanding collisions on the Impact Zone.

19 Claims, 4 Drawing Sheets

COMPOSITE LIFT GATE DEFORMABLE SECTION

FIELD OF THE INVENTION

The present invention relates to a lift gate having a deformable section which allows the lift gate to deform rather than break during a low speed impact event.

BACKGROUND OF THE INVENTION

Many different designs have been employed to reduce the effect of a low speed impact on a vehicle.

The rear ends of vehicles are designed to meet certain impact standards. Automotive manufacturers and regulators have designed a standard referred to as an "Impact Zone" for determining the crashworthiness and crash resistance of a vehicle in a low speed impact. This zone is changed from time to time as vehicles change and regulations and the test criteria change but, typically, there is a rectangular zone with a predetermined width and height which a vehicle will be tested if it is impacted into "block" of material having those dimensions at a certain speed and the damage caused by the impact. This zone is important for crashworthiness assessment. But, the damage caused in this Impact Zone is also significant in part because insurance companies will vary their prices for insuring of vehicles based on how much damage occurs to a particular vehicle when subjected to an impact in this zone. Minimizing the damage to a vehicle and reducing the repair cost of a vehicle impacted in the Impact Zone is, therefore, important in designing vehicles and parts of vehicles.

Lift gates are a rather large and relatively expensive portion of a crossover or SUV vehicle. In the past, these vehicles were designed to have a bumper area extending out from the vehicle which took much of any impacts before the damage of the impact area approached the actual lift gate area. With advances in vehicle designs, a current trend is to have a flush surface on the front and the rear of a vehicle which incorporates the bumper area into a smooth show surface area of the front and rear vehicle design. Such newer designs have now placed the lift gate in the Impact Zone for many vehicles having such lift gates.

Metal lift gates are typically utilized and while some advances have been made such as replaceable crush zone panels. In modern styled vehicles, the Impact Zone may extend into the structural zone of the vehicle. Additionally, the cost of repairing dents and mechanisms in a lift gate collision has gotten to be excessive. Composite lift gates have been attempted as there are weight and cost savings. But, with such lift gates, the lift gate outer skins and the structural support and reinforcement areas are easily damaged, which often are not easily repairable and or repaintable. Therefore, collision damage of composite lift gates often requires replacement of the entire lift gate.

Accordingly, there exists a need for a composite lift gate which limits the impact damage received during a collision to panels of the lift gate which is able to deform and absorb the impact while protecting the structural components of the lift gate from damage and failure.

SUMMARY OF THE INVENTION

The present invention is a lift gate which has a deformable section located between an inner panel and an outer panel. The deformable section is able to deform during a low speed impact event against the outer panel, thereby preventing the inner panel from receiving any of the impact. This allows the inner panel to be significantly more rigid than the outer panel and the deformable section, and, therefore, provides the necessary structural support for the lift gate while withstanding collisions on the Impact Zone.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

An embodiment of a composite lift gate, according to the present invention, is shown in the Figures, generally at 10. In this embodiment, the lift gate 10 includes an inner polymeric structural support panel 12, a deformable polymeric section 14, and a polymeric show surface outer panel 16.

Figure 1:
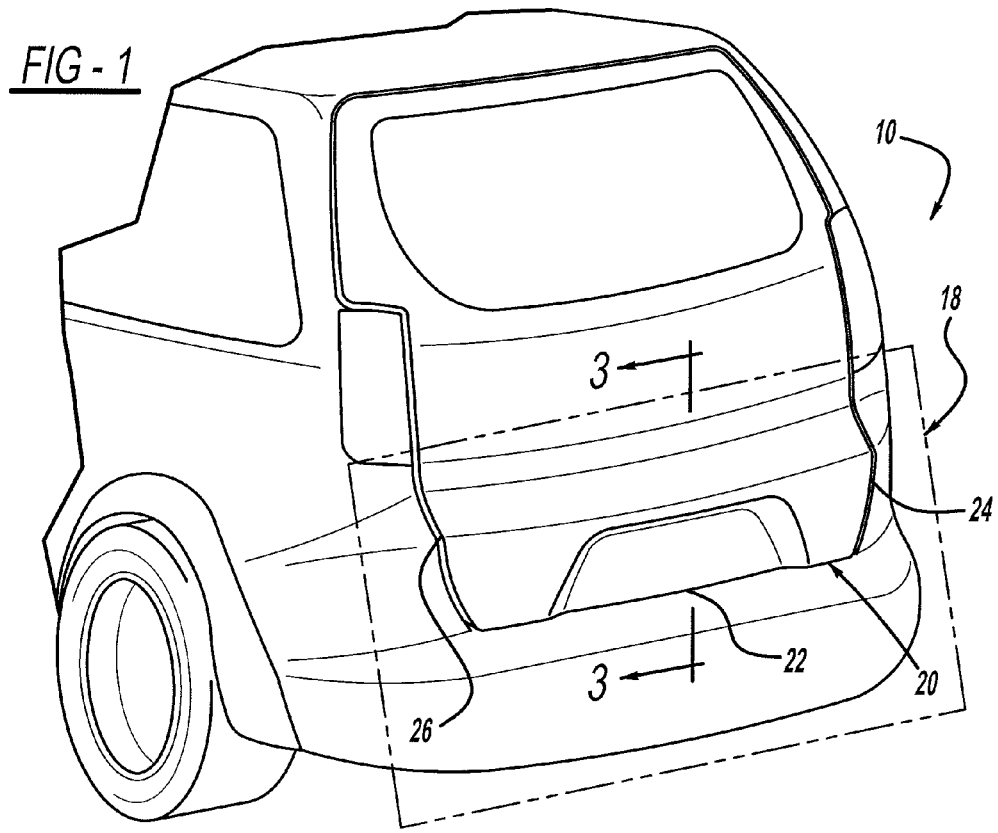
FIG. 1 is a perspective view of a composite lift gate, according to the present invention.
Figure 4:
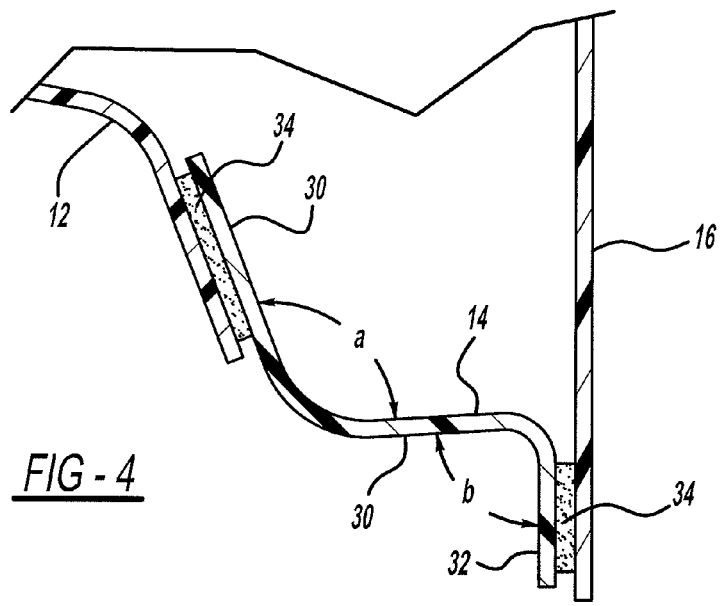
FIG. 4 is a detailed view of the section of FIG. 3 according to the present invention.
Figure 2:
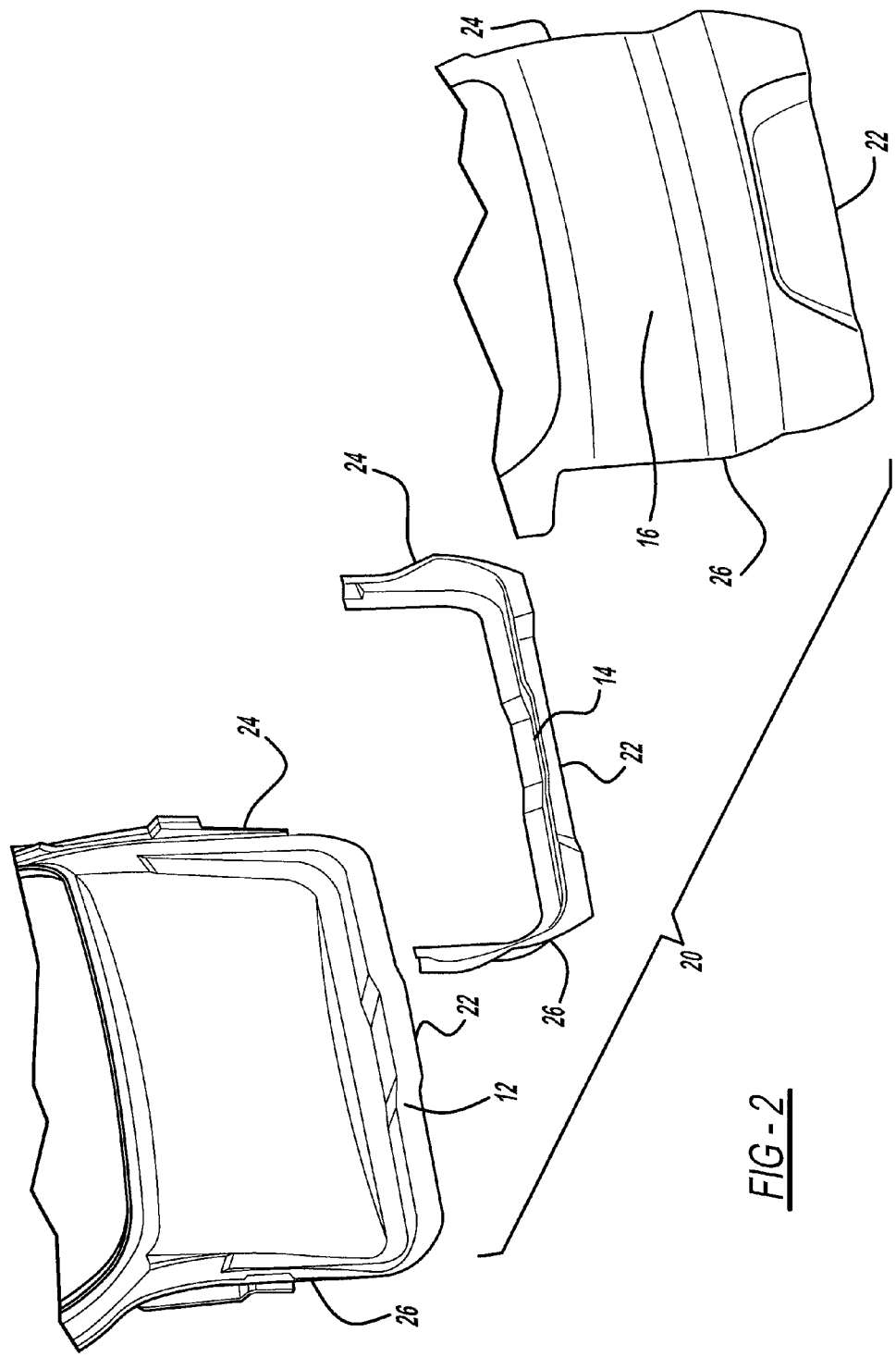
FIG. 2 is an exploded perspective view of a composite lift gate, according to the present invention.
Figure 3:
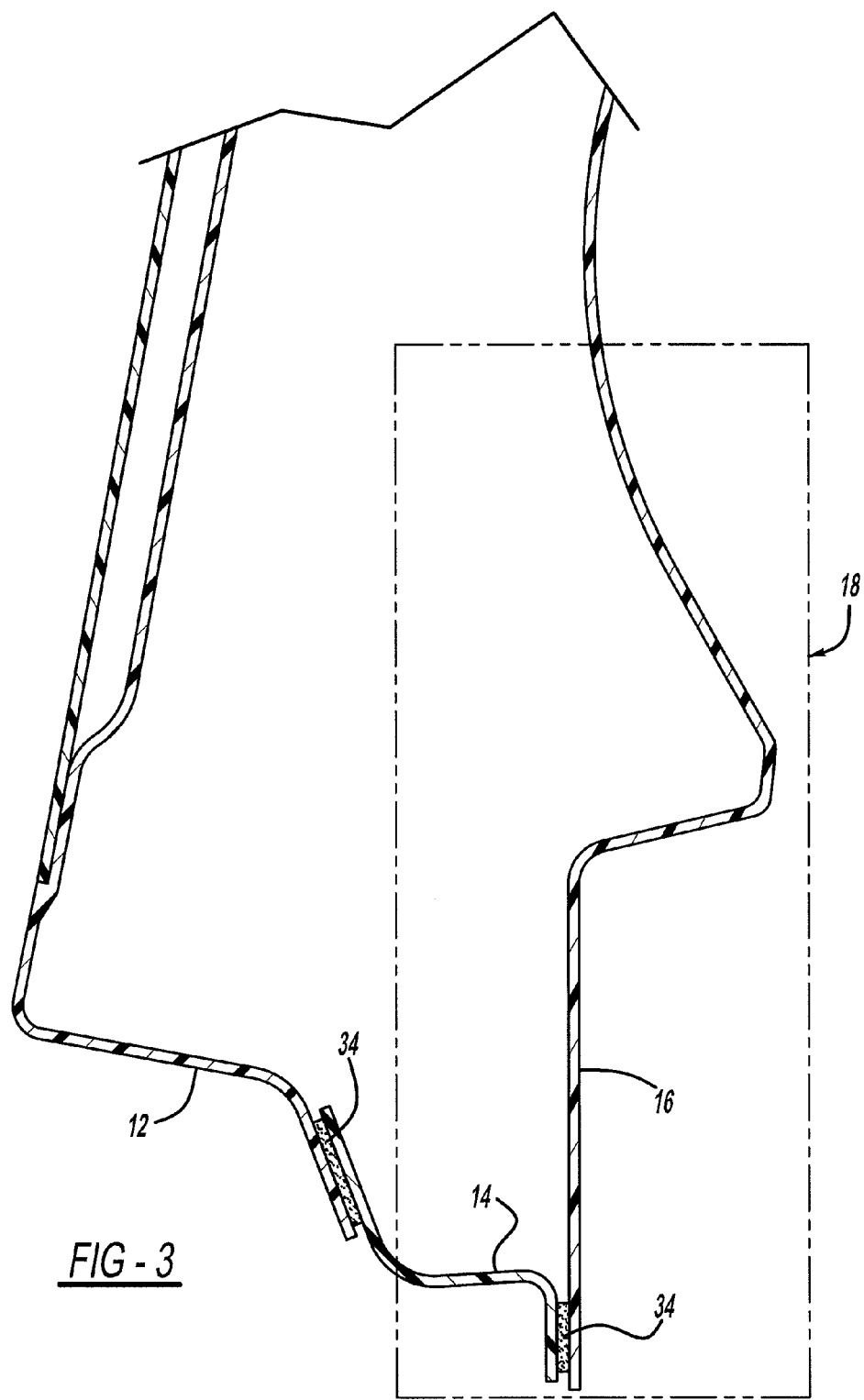
FIG. 3 is a sectional view taken along 3-3 of FIG. 1 showing the deformable portion in detailed section of the composite lift gate, according to the present invention.
Figure 5:
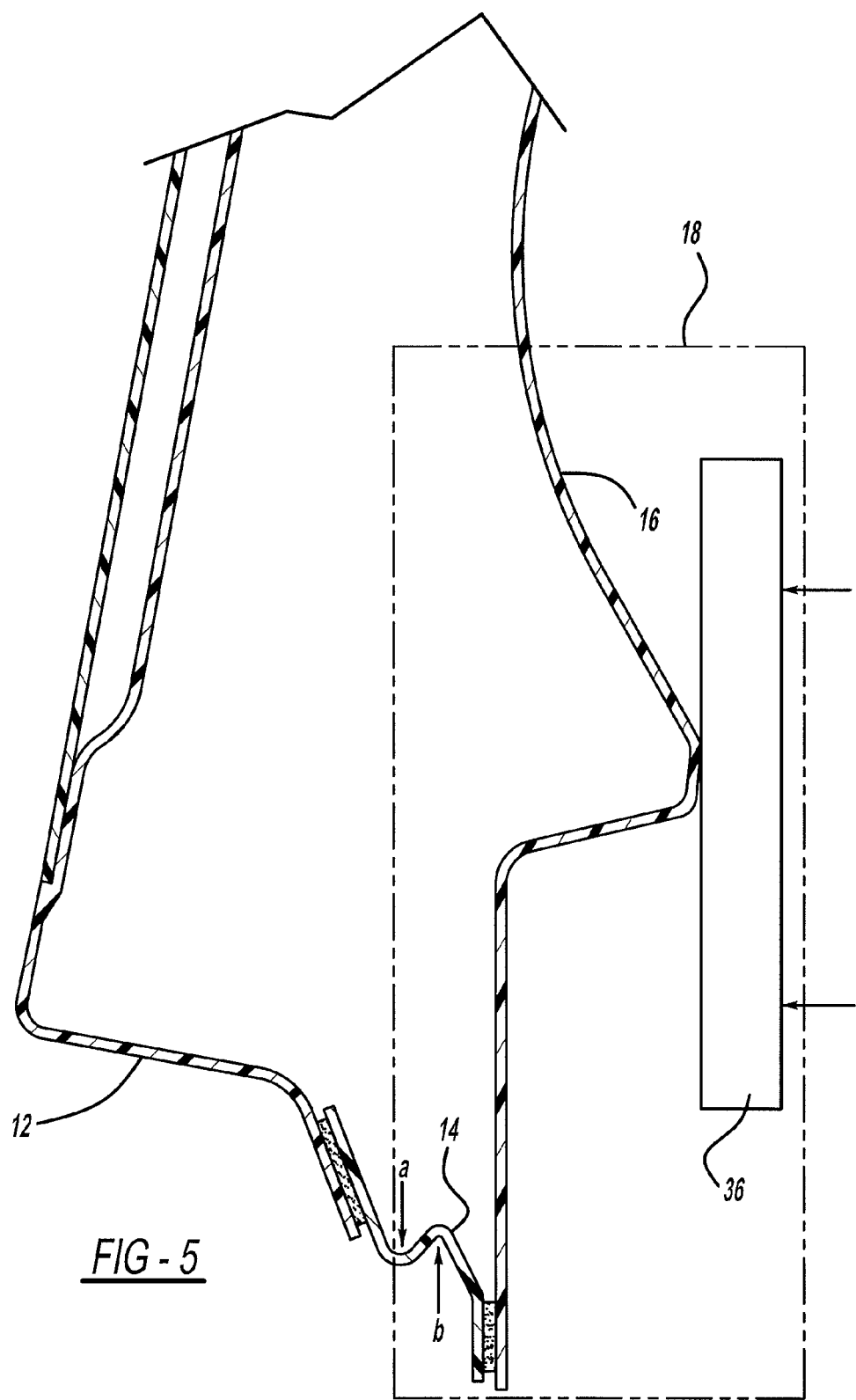
FIG. 5 is a sectional view similar to FIG. 3 showing the deformable section deflecting during and impact, according to the present invention.

The inner panel 12 is structural, and is substantially rigid, and provides support for the other components of the lift gate 10. The deformable section 14 is attached to the inner panel 12, as shown in FIG. 5, and the outer panel 16 is also attached to the inner panel 12 such that the deformable portion 14 is disposed between and connects at least a portion of the inner panel 12 with the outer panel 16.

The outer panel 16 is made of a flexible and resilient material suitable for defining a show surface of the lift gate 10 of the vehicle. Typical materials for the outer panel include thermoplastic polyolefins or other materials that are finishable with paints, paint films or mold in color for matching with the vehicle exterior. It is important that the material selected is flexible and resilient such that upon impact the surface will give way to the impact. Resiliency of the panel is also desired such that the panel will return to its pre-impact contour and configuration. Other suitable materials include graphite fiber reinforced materials, Polycarbonate, PBT, and long glass fiber filled polypropylene.

As set forth in the background, the design of a vehicle has to meet standards relating to an Impact Zone indicated generally at 18. The deformable section 14 connects the inner panel 12 with the outer panel 16 within in the area subject to the Impact Zone. The lift gate includes an outer periphery generally indicated at 20, which includes a lower edge 22 and sides extending therefrom 24 and 26. The deformable portion is designed to follow the outer periphery connecting the inner panel 12 to the outer panel 14. The deformable section is wider at the lower edge 22 of the lift gate periphery and gets narrower progressing up the sides 24 and 26 of the lift gate, forming a wedge shaped profile from a side view.

The deformable section 14 includes a first leg 28, an intermediate leg 30 and a second leg 32. The deformable section 14, the legs 28 and 32 are connected at opposing angles 'a' and 'b' to the intermediate leg 30 for forming a generally 'Z' shaped cross section. This cross section conforms with the outer periphery of the door and is attached to the inner 12 and outer 14 panels by way of an adhesive 34. While two opposing angles are preferred, more than two angles may be utilized depending on the engineering needs of a particular application and the materials utilized.

The adhesive selected for securing the first and second legs (28,32) is of the type which is an adhesive and moisture seal. Other fastening methods may also be used such as ultrasonic welding, heat staking, riveting, screws, nuts and bolts, blind fasteners or the like. Having a moisture seal is typically required if other types of fasteners are utilized in the construction.

The deformable section is a polymeric component which is made of a material which will be deformable and resilient for absorption of an impact and returning to its original configuration. Preferably, the deformable section is injection molded or otherwise formed from an impact modified thermoplastic polyolefin (TPO) such as polypropylene (PP), polyethylene (PE), a block copolymer polypropylene (BCPP), or the like, combined with a reinforcing filler and/or rubber. Typical reinforcing fillers include, but are not limited to, talc, fiberglass, carbon fiber, wollastonite, and metal oxy sulfate (MOS).

Referring now to FIG. 5, during a low speed impact event, an object 36 contacts the outer panel 16, and the outer panel 16 deflects. The deformable section 14 is designed to flex (somewhat accordion or bellows like) at angles 'a' and 'b' also deflecting and absorbing the impact so that the damage from the object does not reach and protects the structural panel, and absorbs the impact, minimizing effect of the impact on the inner panel 12 by keeping the inner panel 14 out of the impact zone 18. Since the inner panel 14 is segregated out of the impact zone 18 by way of the deformable portion 12, this reduces the risk of the inner panel 12 cracking or otherwise failing from the force of the impact within the Impact Zone criteria.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A composite lift gate for a vehicle having a portion thereof in an impact zone, comprising:
   a structural polymeric panel providing structural support for said lift gate;
   a resilient polymeric outer show surface panel;
   a deformable polymeric section connecting said outer panel with said inner panel in the location of the impact zone; and
   said deformable section having a cross section which absorbs impact into the impact zone preventing said inner panel from being deformed during an impact within the zone.

2. The composite lift gate of claim 1, wherein the deformable section is also resilient and flexes during impact and returns to a pre-impact position after impact.

3. The composite lift gate of claim 1, wherein the deformable section has at least two opposing angular portions for bending during absorption of impact.

4. The composite lift gate of claim 3, wherein a cross section of the deformable section includes a first securement leg for securement to the outer panel and an intermediate leg angled at a first angle in a first direction and a second securement leg angled at a second angle in an opposite direction and attached to said structural member such that during impact the deformable section bend along said first angle and said second angle for deforming upon impact.

5. The composite lift gate of claim 4, wherein said outer show surface has a first outer peripheral portion at least partially within the impact zone and said structural polymeric panel has a corresponding second outer peripheral portion and first and second securement legs of said deformable section have corresponding outer peripheral contours for attaching to said first outer peripheral section and said second outer peripheral section.

6. The composite lift gate of claim 5, wherein said outer peripheral portions contour around a lower outer periphery of said lift gate.

7. The composite lift gate of claim 6, wherein said lower periphery of said gate includes a bottom portion and a pair of side portions extending from said bottom portion.

8. The composite lift gate of claim 7, the deformable portion is wider at the lower periphery of said gate and becomes progressively narrow proceeding from the lower periphery upward along the sides, forming a wedge shaped profile from a side view.

9. The composite lift gate of claim 8, wherein the wider portion is situated toward the center of the impact zone.

10. The composite lift gate of claim 2, wherein the cross section of the deformable portion is 'z' shaped.

11. A composite lift gate for a vehicle having a portion thereof in an impact zone, comprising:
    a structural polymeric panel providing structural support for said lift gate, said panel includes structural attachment points and provides structural support for the lift gate;
    a resilient polymeric outer show surface panel;
    a deformable polymeric section connecting said outer panel with said inner panel in the location of the impact zone; and
    said deformable section having a generally 'z' shaped cross section which absorbs impact into the impact zone preventing said inner panel from being deformed during an impact within the zone.

12. The composite lift gate of claim 11, wherein the deformable section is also resilient and flexes during impact and returns to a pre-impact position after impact.

13. The composite lift gate of claim 11, wherein a cross section of the deformable section includes a first securement leg for securement to the outer panel and an intermediate leg angled at a first angle in a first direction and a second securement leg angled at a second angle in an opposite direction and attached to said structural member such that during impact the deformable section bend along said first angle and said second angle for deforming upon impact.

14. The composite lift gate of claim 13, wherein said outer show surface has a first outer peripheral portion at least partially within the impact zone and said structural polymeric panel has a corresponding second outer peripheral portion and first and second securement legs of said deformable section have corresponding outer peripheral contours for attaching to said first outer peripheral section and said second outer peripheral section.

15. The composite lift gate of claim 14, wherein said outer peripheral portions contour around a lower outer periphery of said lift gate.

16. The composite lift gate of claim 15, wherein said lower periphery of said gate includes a bottom portion and a pair of side portions extending from said bottom portion.

17. The composite lift gate of claim 16, the deformable portion is wider at the lower periphery of said gate and becomes progressively narrow proceeding from the lower periphery upward along the sides, forming a wedge shaped profile from a side view.

18. The composite lift gate of claim 17, wherein the wider portion is situated toward the center of the impact zone.

19. A composite lift gate for a vehicle having a portion thereof in an impact zone, comprising:

- a structural polymeric panel providing structural support for said lift gate, said panel include structural attachment points and provides structural support for the lift gate;
- a resilient polymeric outer show surface panel, said outer show surface has a first outer peripheral portion at least partially within the impact zone and said structural polymeric panel has a corresponding second outer peripheral portion;
- a deformable polymeric section connecting said outer panel with said inner panel in the location of the impact zone, said deformable section including a first securement leg for securement to the outer panel and an intermediate leg angled at a first angle in a first direction and a second securement leg angled at a second angle in an opposite direction and attached to said structural member, said deformable section, said first and second securement legs of said deformable section have corresponding outer peripheral contours for attaching to said first outer peripheral section and said second outer peripheral section; and
- said deformable section flexing at least one of said first or second angle for absorbing an impact against said outer show surface panel which is within the impact zone preventing said inner panel from being deformed during an impact within the impact zone.

* * * * *